United States Patent
Persidsky

[19]

[11] Patent Number: 6,130,666
[45] Date of Patent: *Oct. 10, 2000

[54] SELF-CONTAINED PEN COMPUTER WITH BUILT-IN DISPLAY

[76] Inventor: Andre Persidsky, 35 Temescal Ter., San Francisco, Calif. 94118

[*] Notice: This patent issued on a continued prosecution application filed under 37 CFR 1.53(d), and is subject to the twenty year patent term provisions of 35 U.S.C. 154(a)(2).

[21] Appl. No.: 08/944,734

[22] Filed: Oct. 6, 1997

Related U.S. Application Data

[60] Provisional application No. 60/027,823, Oct. 7, 1996.

[51] Int. Cl.[7] ....................................................... G09G 5/00
[52] U.S. Cl. ............................ 345/179; 345/126; 345/156; 382/188; 178/19.01
[58] Field of Search ............................... 178/19.01, 19.02, 178/19.03, 19.04, 19.05; 250/221, 226; 345/179, 180, 163, 156, 157, 158, 169, 123, 126; 382/122, 313, 314, 119, 188–189, 187

[56] References Cited

U.S. PATENT DOCUMENTS

| | | | |
|---|---|---|---|
| 4,418,277 | 11/1983 | Tremmel et al. | 235/472 |
| 4,695,831 | 9/1987 | Shinn | 345/180 |
| 5,023,438 | 6/1991 | Wakatsuki et al. | 235/472 |
| 5,247,137 | 9/1993 | Epperson | 178/19.04 |
| 5,294,792 | 3/1994 | Lewis et al. | 250/221 |
| 5,434,371 | 7/1995 | Brooks | 178/18 |
| 5,548,092 | 8/1996 | Shriver | 178/18 |
| 5,781,661 | 7/1998 | Hiraiwa et al. | 382/188 |
| 6,016,135 | 1/2000 | Biss et al. | 345/126 |

*Primary Examiner*—Richard A. Hjerpe
*Assistant Examiner*—Francis Nguyen

[57] ABSTRACT

A self-contained pen computer which is capable of collecting and recording data representative of handwritten strokes of the pen, and displaying such data in a display screen which is a part of the pen. In the housing of the pen, a pressure sensor is included at the tip of the pen, and a motion sensor which outputs signals describing the motion of the pen, so that handwritten data can be acquired without the need for a special writing surface. These sensors are connected to a signal processing circuit which includes an analog-to-digital converter to convert motion signals and pressure sensor signals into digital code. A microprocessor or microcontroller interprets the digitized motion data, stores the processed data in a memory such as a chip storage device, directs such data to a built-in display such as an LCD, which can display images in real-time corresponding to the processed motion signals, as well as images stored in memory. This display can be driven directly by the processor or by its own dedicated controller. The pen also includes an energy source, such as a battery or solar panel, to power all circuitry.

21 Claims, 3 Drawing Sheets

SELF-CONTAINED PEN COMPUTER WITH BUILT-IN DISPLAY

BACKGROUND-CROSS REFERENCE TO RELATED APPLICATIONS

The present application claims the benefit of provisional application serial #60/027,823, filing date Oct. 7, 1996, entitled "Self-contained pen computer with built-in display" by Andre Persidsky.

BACKGROUND-FIELD OF INVENTION

This invention relates to a device for the collection and storage of data, and particularly, to a self-contained pen computer device that collects and stores handwritten data without requiring a special writing surface, and which has the capability of displaying such data in a display integrally formed with the device.

BACKGROUND-PRIOR ART

There are a number of prior-art, self-contained pen computers capable of acquiring handwritten data through motion-sensing means, and storing such data in onboard memory. Such prior-art self-contained pen computers rely on a remote computer to display the collected data. Data is typically transferred to a separate computer through direct coupling, or by wireless transmission, such as a radio link or infrared transmitter, either in real-time, or after a certain amount of data has been collected.

U.S. Pat. No. 5,294,792, Writing Tip Position Sensing And Processing Apparatus, Mar. 15, 1994, discloses a self-contained pen computer for the acquisition, recognition, compaction, storage, and transmission of written data. Such acquired data is transmitted to a separate computer, which can then decode and display a reproduction of the hand strokes.

U.S. Pat. No. 5,434,371, Hand-Held Electronic Writing Tool, Jul. 18, 1995, discloses a hand-held, self-powered writing instrument which has self-contained means of recording handwritten data, and transferring such data to a separate computer, which can then display the data. This writing instrument has a stylus such as a rolling ball ink writer, or a felt-tip marker which concurrently marks a writing surface and processes and transmits pen movement signals to the separate computer display. This device requires a markable writing surface. Relying on a remote computer display also creates serious portability limitations since the user is required to be in the vicinity of the remote computer display in order to transmit, edit, and view the collected data from the self-contained pen computer.

There are several disadvantages to the above prior-art devices. Users must view a separate and remote display screen to observe the progress of the data input and to be assured of its accuracy.

OBJECTS AND ADVANTAGES

These and other disadvantages of the prior art are overcome by the present invention. A new self-contained pen computer is provided which contains all the means necessary to acquire, store, view, and edit handwritten data.

It is therefore an object of the present invention to provide a self-contained pen computer which allows its user to record multiple handwritten images of any form in the pen's memory, and to allow the viewing of such stored images in the built-in display, as well as the viewing of images as they are being drawn. It is another object of the present invention to allow the user to edit stored handwritten images in the built-in display.

It is another object to provide a self-contained pen computer which allows its user to acquire handwritten data without requiring a markable writing surface such as paper, or relying on any special type of writing surface such as a pressure sensitive tablet or touch screen.

These and other objects and advantages of the present invention will become clear from the following detailed description, wherein reference is made to the figures in the accompanying drawings.

SUMMARY OF THE INVENTION

The present invention pertains to a self-contained pen computer which is capable of collecting and recording data representative of handwritten strokes of the pen, and then displaying such data in a display screen which is a part of the pen. The self-contained pen computer acquires handwritten data without requiring a special writing surface such as a paper, tablet, or touch screen. The present invention also pertains to a method for creating, editing, and recording such data.

The pen computer includes a pressure sensor at the tip of the pen, and a motion sensor which outputs signals describing the motion of the pen. These sensors are connected to a signal processing circuit. An analog-to-digital converter is included to convert motion signals and pressure sensor signals into digital code. A microprocessor or microcontroller is used to interpret digitized motion data, store processed data in a memory such as a chip storage device, redirect such data to a display, and control the user interface. A key part of the pen computer is a built-in display, such as an LCD, which can display images in real-time corresponding to the processed motion signals, as well as images stored in memory. This display can be driven directly by the processor or by it's own dedicated controller. The pen computer also includes an energy source such as a battery or solar panel to power all circuitry.

DETAILED DESCRIPTION

Figure 1:
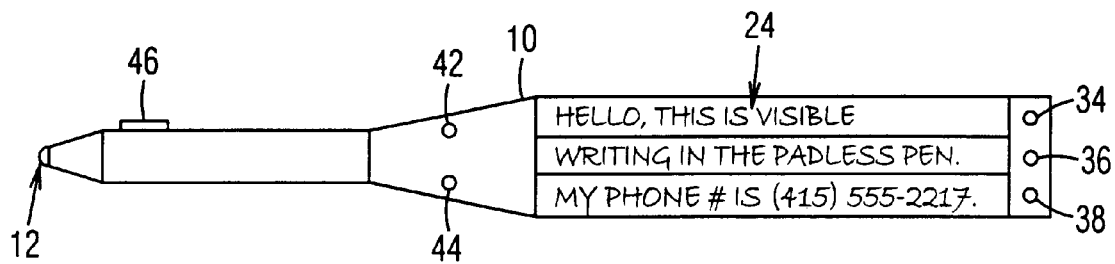
FIG. 1 depicts a preferred embodiment of the self-contained pen computer of the present invention with acquired handwritten data visible in the display.

FIG. 1 shows a preferred embodiment of a self-contained pen computer of the present invention for the collection, display, and editing of handwritten data. Handwritten data refers, but is not limited, to notes, drawings, traced patterns, and [printed or cursive] letters, numbers, or symbols. The self-contained pen computer consists of a hand-held housing 10 with one end forming a writing tip 12. Housing 10 is not limited to a pen shape, and may be any shape, such as cylindrical, trapezoidal, or elliptical, but preferably one conducive to handwriting or drawing. Housing 10 may be constructed out of plastic, alumninum, or other materials.

A display 24 is mounted parallel to the longitudinal axes of housing 10 on an exterior surface of housing 10. Display 24 may use a passive or active-matrix LCD, or another display technology. In the preferred embodiment, the display uses a LCD which has a resolution of at least 100×50 pixels. The left edge of display 24 is positioned approximately at the center of housing 10, and display 24 extends to the end of housing 10 opposite writing tip 12, so that display 24 is approximately half the length of housing 10. The end of housing 10 opposite writing tip 12 contains a button 34 for turning on or off a light which illuminates display 24 for nighttime or low-light operation. If display 24 is implemented as a LCD, this light can be part of the LCD in the form of a backlight. This portion of the housing also contains a mode button 36 which selects one of several possible modes which are described in the operation section below, and an on/off button 38 to turn the pen computer on or off. The section of housing 10 adjacent to the edge of display 24 closest to writing tip 12 holds page up and page down buttons 42 and 44, which are used to control which page of image memory is currently displayed in display 24. Located close to writing tip 12 on the exterior surface of housing 10 is erase button 46.

Figure 2:
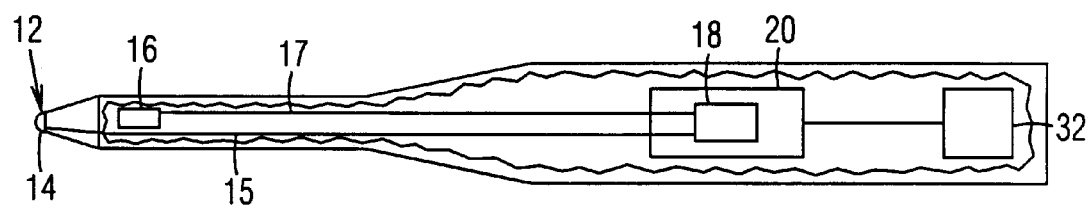
FIG. 2 is a cutaway view of the preferred embodiment of the self-contained pen computer which shows the pressure sensor and movement sensor connected to the analog-to-digital converter.
Figure 3:
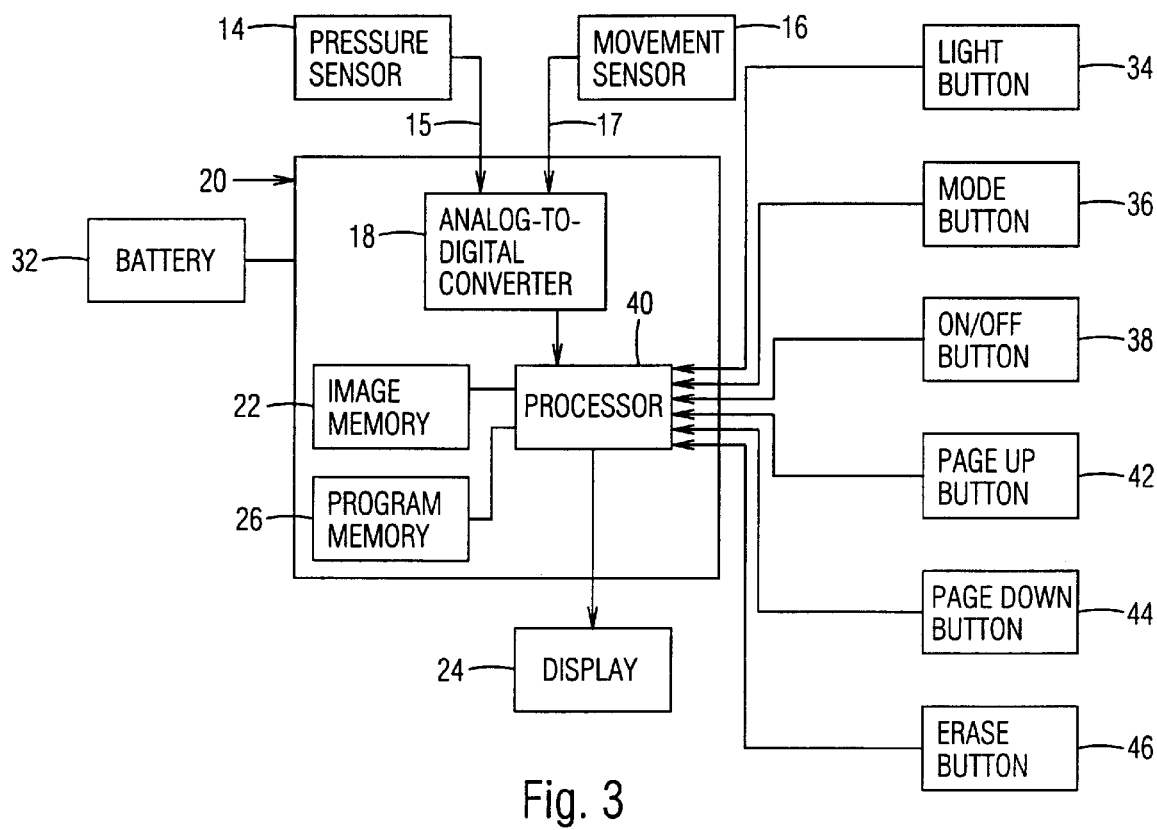
FIG. 3 depicts a functional block diagram of the signal processing of the present invention.

As shown in FIG. 2, writing tip 12 contains a pressure sensor 14 in order to detect when writing tip 12 is pressed against a surface (not shown). When pressed against the surface, pressure sensor 14 outputs a signal through a wire 15 to an analog-to-digital converter 18 which is part of a signal processing circuit 20, illustrated in FIG. 3. Pressure sensor 14 is spring activated so that the user feels a click to confirm that a threshold pressure has been surpassed, which is used to activate drawing or erasing in display 24.

Figure 9:
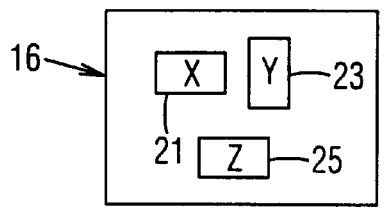
FIG. 9 is a view of the accelerometers which comprise the movement sensor.

Housing 10 contains a movement sensor 16, which outputs signals corresponding to the direction, velocity, or acceleration of writing tip 12. Any type of movement-sensing device or devices may be employed to track the movement of writing tip 12. In the preferred embodiment, movement sensor 16 is comprised of accelerometers 21, 23, and 25 as shown in FIG. 9, which are used to sense movement along three orthogonal axes. Accelerometers 21 and 23 are oriented perpendicularly to each other in the same plane to sense acceleration in at least two perpendicular directions in a plane, the X and Y directions. Accelerometer 25 is oriented perpendicularly to that plane to sense acceleration in the Z direction. Movement sensor 16 is connected to analog-to-digital converter 18 by wire 17.

Signal processing circuit 20 utilizes analog-to-digital converter 18 to digitize signals from pressure sensor 14 and movement sensor 16. These digitized signals are sent to a processor 40 which is part of signal processing circuit 20. Processor 40 can be a standard or application-specific microprocessor or microcontroller. Processor 40 is used to process digitized movement signals to determine the distance and direction writing tip 12 has moved in a given time in order to track the handwritten pattern as it is being drawn. Processor 40 uses a direction detection and distance determination program in a program memory 26 to determine the distance and direction writing tip 12 has moved in a given time. The distance determination program integrates the digitized acceleration signals from movement sensor 16 to determine distance. Processor 40 stores a reconstructed image of the path that writing tip 12 traverses in an image memory 22. Image memory 22 may be a separate chip storage device such as a RAM chip or it may be incorporated within processor 40. Processor 40 is also used to drive the pixels that are displayed on display 24. Alternately, a dedicated controller can be used to drive display 24.

Program memory 26 also holds all the software necessary for processor 40 to perform all pen computer functions such as acquiring, storing, displaying, editing, and recognizing handwritten data, as well as controlling the user interface. Program memory 26 may be implemented as RAM, ROM, EEPROM, or any other type of memory. This memory may also be incorporated into the integrated circuit of processor 40.

Figure 4:
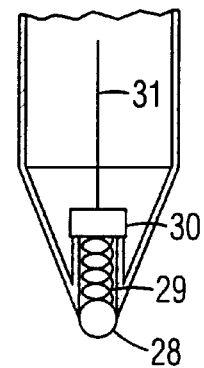
FIG. 4 is an enlarged view of the writing tip of an alternative embodiment of the self-contained pen computer which employs a mechanical follower as the movement sensing means.

In an alternative embodiment, a mechanical follower 28, rather than accelerometers 21, 23, and 25 is used to track the movement of writing tip 12, as shown in FIG. 4. Mechanical follower 28 may be a small inverted trackball which is positioned on writing tip 12, and can rotate freely as writing tip 12 is dragged along a surface to generate movement signals. Digital signals can be derived using a pair of rotary encoders attached to the trackball along the X and Y axes (not shown). Mechanical follower 28 is mounted on a spring 29 which is connected to a pressure sensor 30 inside housing 10 such that when mechanical follower 28 is pressed against a surface, pressure sensor 30 outputs a signal to analog-to-digital converter 18 through a wire 31.

The shape of housing 10 and orientation of display 24 are such that when the pen computer is held at the most common and natural writing angles relative to a surface (approximately between 45–70 degrees from horizontal), display 24 remains visible so that the progress of handwriting can be observed in display 24 as writing tip 12 moves across a surface. This is true for both left and right handed operation.

Housing 10 contains a battery 32 for powering all the pen computer circuits.

OPERATION

Figure 5:
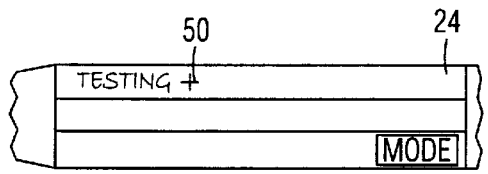
FIG. 5 is a view of the display with a cursor visible.
Figure 7:
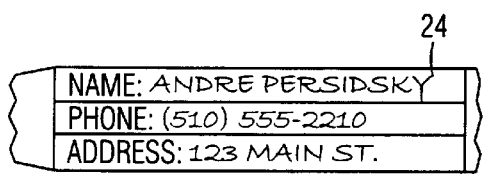
FIG. 7 is a view of the display when the present invention is in database mode.
Figure 10:
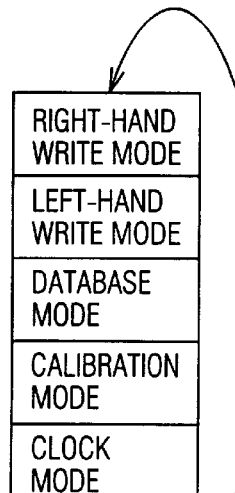
FIG. 10 is a mode flowchart for the preferred embodiment.

The self-contained pen computer of FIG. 1 has several modes of operation. In the preferred embodiment, mode button 36 is used to select whether the pen computer is in right-hand write mode, left-hand write mode, database mode, calibration mode, or clock mode. Pressing mode button 36 repeatedly cycles through this series of modes, which are illustrated in FIG. 10. The current mode setting is indicated by a small symbol in one of the corners of display 24, as shown in FIG. 5. The write modes allow either right-handed or left-handed users to generate and edit any handwritten forms, including drawings and symbols. In database mode, the user enters handwritten data into fields visible in display 24 as shown in FIG. 7. In clock mode, the pen computer functions as a clock with display 24 showing the current time. The clock mode may contain features such as an audible alarm and stopwatch. Page up and page down buttons 42 and 44 are used to set the current time in clock mode. On/off button 38 is used to turn on or off the pen computer. When off, enough power is supplied to image memory 22 to preserve any collected data.

In either write mode, the user controls the number of rows which display 24 is divided into for the purpose of organizing handwritten data, by simultaneously pressing the page up and page down buttons 42 and 44 repeatedly. FIG. 1 depicts display 24 divided into three rows.

When acquiring handwritten data, the pen computer is operated in either right-hand write mode, or left-hand write mode. In right-hand write mode, data is drawn in display 24 from left to right, that is, starting from the top corner of display 24 closest to the center of housing 10 to the opposite edge of the display 24 as shown in FIG. 1. In left-hand write mode, written data acquired in display 24 flips orientation, i.e., data is drawn in display 24 starting in the diagonal corner opposite the starting corner in right-hand write mode, and moves to the edge of display 24 closest to the center of housing 10.

In either write mode, display 24 displays a cursor 50 as shown in FIG. 5. As the user moves writing tip 12, cursor 50 moves in a direction and by a distance directly corresponding to the movement of writing tip 12. This is analogous to moving a pointer or cursor across a computer screen using a mouse, roller ball, accupoint, or track pad input device.

Figure 11:
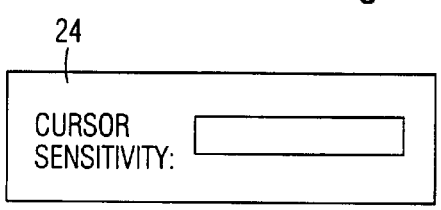
FIG. 11 is a view of the display in calibration mode.

Mode button 36 is used to select a calibration mode through which the user can adjust the sensitivity of the movement of cursor 50 in relation to the movement of writing tip 12. When in this mode, display 24 displays a horizontal bar which represents the sensitivity of cursor 50 as shown in FIG. 11. The larger the bar, the more sensitive is the movement of cursor 50. By moving writing tip 12 right or left in this mode, the horizontal bar changes size to increase or decrease sensitivity of cursor 50.

Figure 6:
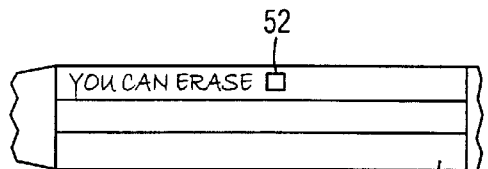
FIG. 6 is a view of the display with an erase symbol visible.

In order for the user to draw or write in display 24, the user moves writing tip 12 across a surface while pressing writing tip 12 against the surface with sufficient force to activate pressure sensor 14. This causes the cursor to leave behind a trail of pixels corresponding to the stroke length, direction, and curvature of writing tip 12. The user can erase pixels in display 24 by pressing erase button 46 which causes the cursor to change into a square erase symbol 52 as shown in FIG. 6. Erasing of recorded data occurs when the user presses erase button 46 while moving writing tip 12 to move erase symbol 52 over the pixels in display 24 that are to be erased.

In the preferred embodiment, the user repositions cursor 50 to any position in display 24 by moving writing tip 12 and at the same time not activating pressure sensor 14 or erase button 38. The user can move writing tip 12 along a surface to reposition cursor 50 or, because the preferred embodiment utilizes accelerometers for the movement sensor 16, writing tip 12 can be moved through the air as a means to repositioning cursor 50. This allows the user to lift and move writing tip 12 off the surface between words, without losing track of the relative position of cursor 50, much like writing with a standard ink pen. This method also makes it easy for the user to reposition the cursor in order to cross a letter "t" or dot a letter "i". Additional writing or erasing can resume at the new cursor position. In the embodiment which utilizes mechanical follower 28 as the movement sensor, cursor repositioning occurs only when writing tip 12 is dragged across a surface.

When the cursor is moved to the end of a line in display 24, the software in program memory 26 repositions cursor 50 at the beginning of the next line automatically to eliminate the need to manually reposition cursor 50.

The overall process of drawing and erasing handwritten data in display 24 is similar to drawing and erasing with a mouse in a computer paint program. There, moving the mouse without pressing the mouse button repositions the cursor in the paint window, while pressing the mouse button and moving the mouse causes the cursor to leave a trail of pixels. Similarly, erasing occurs when an erase button or mode has been selected, and the cursor (which has changed into an erase symbol) is moved across existing pixel data while the mouse button is pressed.

In either write mode, page up and page down buttons 42 and 44 are used to select which page of image memory 22 is currently displayed in display 24. Display 24 has a small number in its bottom right corner indicating which page of image memory is currently shown. Image memory 22 is large enough to accommodate at least 50 pages, where a page is the size of display 24.

In database mode, the pen computer has predefined fields into which handwritten data can be entered. As shown in FIG. 7, these fields appear as printed text characters or symbols on the left side of the rows in display 24 and handwritten data appears to the right of each field. For example, a contact record is included which has the fields "name", "phone", and "address", as shown in FIG. 7. This record definition is stored in program memory 26.

Figure 8:
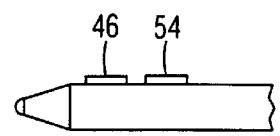
FIG. 8 is a partial view of an alternative embodiment of the present invention which employs a write button beside the erase button.

In another embodiment, instead of using pressure sensor 14 to determine when writing paths are to be recorded, housing 10 has a write button 54 located next to erase button 46 near writing tip 12 as shown in FIG. 8. When write button 54 is pressed and writing tip 12 is moved, cursor 50 generates a trail of pixels corresponding to the movement of writing tip 12, as long as the pen computer is in a write mode. This allows a user to draw images or words in display 24 by moving writing tip 12 through the air, requiring no surface whatsoever to acquire or edit handwritten data.

Figure 12:
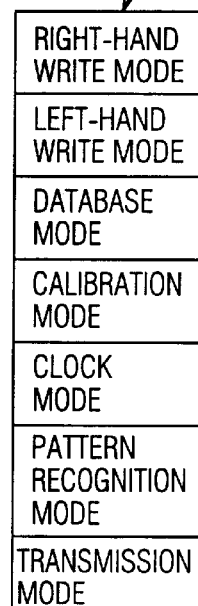
FIG. 12 is a mode flowchart for an alternative embodiment.
Figure 13:
FIG. 13 is a cutaway view of an alternative embodiment of the present invention showing a transmitter.

In another embodiment, the self-contained pen computer has two additional modes, the pattern recognition mode and transmission mode, which are selectable by pressing mode button 36. FIG. 12 shows a mode flowchart. In pattern recognition mode, the pen computer would recognize handwritten images in image memory 22, and identify and store them as predefined symbols such as ASCII characters in a designated part of image memory 22. Program memory 26 would store the pattern recognition program, as well as hand print data with which to compare input data in image memory 22 against. In this embodiment, the self-contained pen computer has a transmitter 70 or a connector for transferring collected handwritten data to a separate computer, as shown in FIG. 13. The transmitter could use infra red or radio frequency transmission means. Data in the form of bitmaps or recognized characters can be transferred to a separate computer.

Although the above description contains many specificities, these should not be construed as limiting the scope of the invention but merely as providing illustrations of some of the preferred embodiments of this invention. Many variations are possible and are to be considered within the scope of the present invention. For instance, the arrangement of buttons on the exterior surface of housing 10 can be different, or movement sensor 16 can use alternative means of tracking the movement of writing tip 12, etc. Thus the scope of the invention should be determined not by the examples given, but rather by the appended claims and their legal equivalents.

What is claimed is:

1. A pen computer, comprising:

an elongated hand-held housing with a writing tip;

a processor in said housing, said processor being arranged to record handwritten data;

a movement sensor in said housing, said movement sensor connected to said processor and tracking movement of said housing; and a display on an upper portion of said housing for being viewable while a lower portion of said housing is held in a hand, said display being arranged to display said handwritten data;

said processor is arranged to provide a database mode which includes a plurality of predefined fields shown on said display, said processor being arranged to record and display said handwritten data in said fields, each of said fields including a predetermined field symbol for guiding a user during data entry.

2. A pen computer, comprising:

an elongated hand-held housing with a writing tip;

a processor in said housing, said processor being arranged to record handwritten data;

a movement sensor in said housing, said movement sensor connected to said processor and tracking movement of said housing; and a display on an upper portion of said housing for being viewable while a lower portion of said housing is held in a hand, said display being arranged to display said handwritten data;

said display is arranged to display at least a plurality of rows of said handwritten data, and said processor is arranged to automatically advance said handwritten data from one of said rows to a next row as each of said rows is filled.

3. A pen computer, comprising:

an elongated hand-held housing with a writing tip;

a processor in said housing;

a movement sensor in said housing, said movement sensor connected to said processor and tracking movement of said housing, said processor being arranged for recording hand drawn patterns;

a display on an upper portion of said housing for being viewable while a lower portion of said housing is held in a hand, said display connected to said processor for displaying said hand drawn patterns, said display is arranged to display at least a plurality of rows of said hand drawn patterns; and a button on said housing and connected to said processor, said button controlling the number of said rows shown on said display.

4. A pen computer, comprising:

an elongated hand-held housing with a writing tip;

a processor in said housing, said processor being arranged to record handwritten data;

a movement sensor in said housing, said movement sensor connected to said processor and tracking movement of said housing;

a display on an upper portion of said housing for being viewable while a lower portion of said housing is held in a hand, said display being arranged to display said handwritten data; and a mode button on said housing and connected to said processor, said processor cycling through a plurality of predetermined operating modes when said mode button is pressed, said processor being arranged to display a mode symbol on said display corresponding to a currently selected mode.

5. A pen computer, comprising:

an elongated hand-held housing with a writing tip;

a processor in said housing;

a movement sensor in said housing, said movement sensor connected to said processor and tracking movement of said housing, said processor being arranged for recording hand drawn patterns; and a display on an upper portion of said housing for being viewable while a lower portion of said housing is held in a hand, said display connected to said processor for displaying said hand drawn patterns;

said processor is arranged to provide a calibration mode for adjusting sensitivity of said movement sensor, wherein a bar of adjustable length is displayed on said display, a length of said bar being directly proportional to sensor sensitivity, said processor being arranged to adjust said length of said bar in response to movement of said writing tip.

6. A pen computer, comprising:

an elongated hand-held housing with a writing tip;

a processor in said housing;

a movement sensor in said housing, said movement sensor connected to said processor and tracking movement of said housing, said processor being arranged for recording hand drawn patterns; and a display on an upper portion of said housing for being viewable while a lower portion of said housing is held in a hand, said display connected to said processor for displaying said hand drawn patterns;

said processor is arranged to provide a right hand mode for displaying said hand drawn patterns upright when said housing is held in a right hand, and a left hand mode for displaying said hand drawn patterns inverted relative to said right hand mode when said housing is held in a left hand.

7. A pen computer, comprising:

an elongated hand-held housing with a writing tip;

a processor in said housing, said processor being arranged to record handwritten data;

a movement sensor in said housing, said movement sensor connected to said processor and tracking movement of said housing;

a display on an upper portion of said housing for being viewable while a lower portion of said housing is held in a hand, said display being arranged to display said handwritten data, and a write button on said housing near said writing tip for being pressed by a finger, said write button being connected to said processor, said processor being arranged to record and display said handwritten data when said write button is pressed, so that said handwritten data is captured even when writing tip is moved through the air.

8. A pen computer, comprising:

a hand-held housing with a writing tip;

a processor in said housing;

a pressure sensor in said writing tip and connected to said processor for sensing engagement with a writing surface;

a movement sensor in said housing, said movement sensor connected to said processor and tracking movement of said writing tip when on said writing surface and also when away from said writing surface; and a display on said housing and connected to said processor;

when said pressure sensor senses that said writing tip is pressed onto said writing surface, said processor is arranged to track the movement of said writing tip and display a corresponding first portion of a hand drawn pattern on said display;

when said pressure sensor senses that said writing tip is lifted from said writing surface, said processor is arranged to continue tracking the movement of said writing tip without displaying a corresponding second portion of said hand drawn pattern on said display;

when said pressure sensor senses that said writing tip is again pressed onto said writing surface, said processor is arranged to continue tracking the movement of said writing tip and display a corresponding third portion of said hand drawn pattern on said display;

said processor is thus arranged to record and display disconnected elements of a written pattern in proper spatial relationships.

9. The pen computer of claim 8, wherein said processor is arranged to provide a database mode which includes a plurality of predefined fields shown on said display, said processor being arranged to record and display a plurality of different hand drawn patterns in said fields, each of said fields including a predetermined field symbol for guiding a user during data entry.

10. The pen computer of claim 8, wherein said display is arranged to display at least a plurality of rows of additional hand drawn patterns, and said processor is arranged to automatically advance said hand drawn patterns from one of said rows to a next row as each of said rows is filled.

11. The pen computer of claim 8, wherein said display is arranged to display at least a plurality of rows of additional hand drawn patterns, and further including a button on said housing and connected to said processor, said button controlling the number of said rows shown on said display.

12. The pen computer of claim 8, further including a mode button on said housing and connected to said processor, said processor cycling through a plurality of predetermined operating modes when said mode button is pressed, said processor being arranged to display a mode symbol on said display corresponding to a currently selected mode.

13. The pen computer of claim 8, wherein said processor is arranged to provide a calibration mode for adjusting sensitivity of said movement sensor, wherein a bar of adjustable length is displayed on said display, a length of said bar being directly proportional to sensor sensitivity, said processor being arranged to adjust said length of said bar in response to movement of said writing tip.

14. The pen computer of claim 8, wherein said processor is arranged to provide a right hand mode for displaying said hand drawn patterns upright when said housing is held in a right hand, and a left hand mode for displaying said hand drawn patterns inverted relative to said right hand mode when said housing is held in a left hand.

15. A pen computer, comprising:

a hand-held housing;

a processor in said housing;

a movement sensor in said housing, said movement sensor connected to said processor and tracking movement of said housing;

a write button on said housing near a lower end for being pressed by a finger, said write button being connected to said processor; and a display on said housing and connected to said processor;

when said write button is pressed, said processor is arranged to track the movement of said housing and display a corresponding first portion on said display;

when said write button is released, said processor is arranged to continue tracking the movement of said housing without displaying a corresponding second portion;

when said write button is again pressed, said processor is arranged to continue tracking the movement of said housing and again displaying a corresponding third portion;

said processor is thus arranged to record and display disconnected elements of a handwritten pattern in proper spatial relationships even when said housing is moved entirely through the air.

16. The pen computer of claim 15, wherein said processor is arranged to provide a database mode which includes a plurality of predefined fields shown on said display, said processor being arranged to record and display said handwritten patterns in said fields, each of said fields including a predetermined field symbol for guiding a user during data entry.

17. The pen computer of claim 15, wherein said display is arranged to display at least a plurality of rows of said handwritten patterns, and said processor is arranged to automatically advance said handwritten patterns from one of said rows to a next row as each of said rows is filled.

18. The pen computer of claim 15, wherein said display is arranged to display at least a plurality of rows of said handwritten patterns, and further including a button on said housing and connected to said processor, said button controlling the number of said rows shown on said display.

19. The pen computer of claim 15, further including a mode button on said housing and connected to said processor, said processor cycling through a plurality of predetermined operating modes when said mode button is pressed, said processor being arranged to display a mode symbol on said display corresponding to a currently selected mode.

20. The pen computer of claim 15, wherein said processor is arranged to provide a calibration mode for adjusting sensitivity of said movement sensor, wherein a bar of adjustable length is displayed on said display, a length of said bar being directly proportional to sensor sensitivity, said processor being arranged to adjust said length of said bar in response to movement of said writing tip.

21. The pen computer of claim 15, wherein said processor is arranged to provide a right hand mode for displaying said handwritten patterns upright when said housing is held in a right hand, and a left hand mode for displaying said handwritten patterns inverted relative to said right hand mode when said housing is held in a left hand.

* * * * *